Dec. 7, 1948.  J. E. FLANAGAN  2,455,891
SHOCKPROOF MOUNTING
Filed July 16, 1947
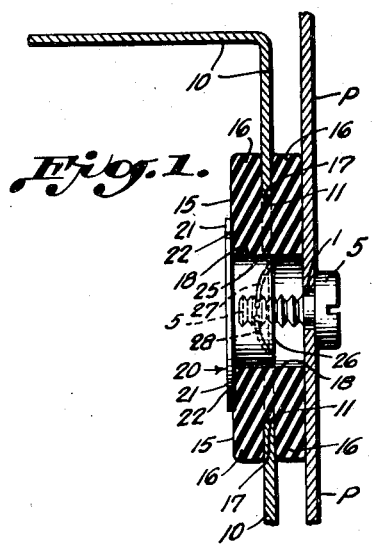
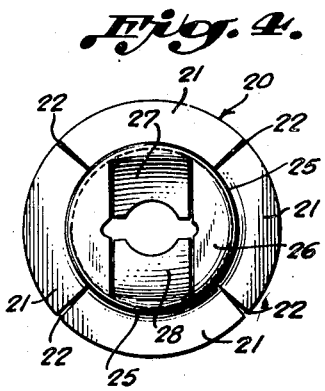
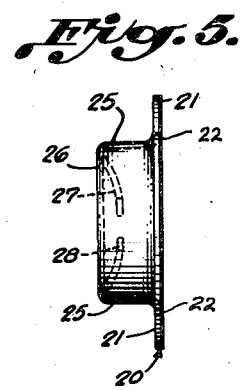
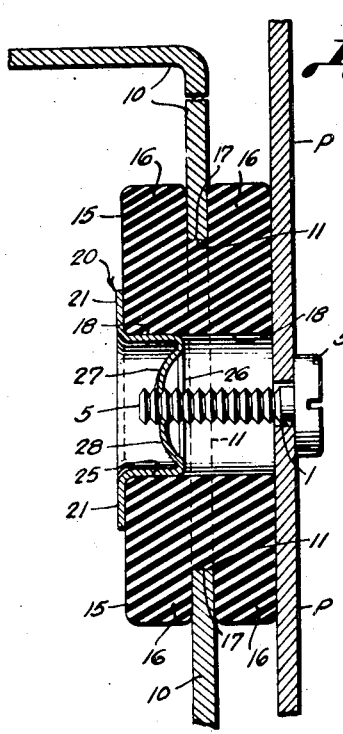
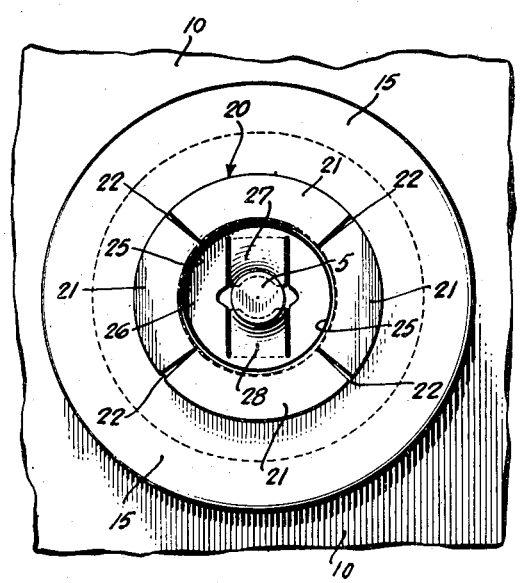
INVENTOR
JOHN E. FLANAGAN
BY H. G. Lombard
ATTORNEY Patented Dec. 7, 1948

2,455,891

UNITED STATES PATENT OFFICE 2,455,891

SHOCKPROOF MOUNTING

John E. Flanagan, Chicago, Ill., assignor to Tinnerman Products, Inc., Cleveland, Ohio, a corporation of Ohio Application July 16, 1947, Serial No. 761,389

3 Claims. (Cl. 248—358)

1

This invention relates in general to mounting installations and deals, more particularly, with an improved shockproof and insulated support which is particularly useful in providing a simple and inexpensive means to dampen vibration effects, and the like, in the fabrication and mounting of parts in lightweight structures.

A primary object of the invention is to provide a highly simplified shockproof and insulated support which comprises a simple grommet made of rubber or other resilient material and a combined washer, bushing and nut device having a resilient threaded connection with a bolt or screw securing the support in a completed mounting in a manner whereby the resiliency of said resilient threaded connection of the nut device adds to and forms a part of the resiliency of the shockproof support.

A further object of the invention is for the provision of such a shockproof and insulated support which is strong, durable and reliable and the parts thereof readily provided in relatively small sizes for use in close quarters and installations where space is limited.

Another object of the invention is to provide a shockproof and insulated support of the kind described, a combined washer, bushing and resilient nut device which is simple and inexpensive to manufacture and is admirably suited for economical quantity production in that it may be formed at low cost from standard sheet metal stock with little loss or waste of material.

Further objects and advantages of the invention, and other new and useful features in the construction, arrangement and general composition of parts thereof will be readily apparent as the following description proceeds with reference to the accompanying drawings, for purposes of illustration but not of limitation, in which like reference characters designate like parts throughout, and in which:

Figure 1 is a vertical sectional view illustrating a mounting installation embodying the improved shockproof and insulated support of the invention with the combined washer, bushing and nut member shown in elevation:

Figure 2 is a sectional view similar to Fig. 1, on an enlarged scale, with the combined washer, bushing and nut device shown in section;

Figure 3 is a side view of the completed shockproof and insulated support as seen from the left of Fig. 2;

Figure 4 is an enlarged top plan view of the combined washer, bushing and nut device shown employed in Figs. 1 to 3 inclusive; and Figure 5 is a side view of the fastener per se shown in Fig. 4.

The invention is disclosed in connection with a shockproof and insulated support which is employed, for example, in a radio apparatus, in mounting the chassis of a radio set in the cabinet structure, casing, or the like. It is to be understood, however, that the invention is not in any way limited to such use inasmuch as the shockproof and insulated support is one of general utility which is equally adapted to various other applications and uses in the fabrication and mounting of lightweight structures in which it is necessary or desirable to provide a simple and inexpensive means for dampening vibratory motion, shock and jarring effects, and the like.

Referring now, more particularly to the drawings, Figs. 1, 2, and 3 illustrate the invention as employed to support a plate-like member 10 representing a base, frame or bracket member forming a part of the chassis of a radio apparatus, for example, which is secured in a shockproof and insulated mounting to the panel member P, of a cabinet structure, casing or other housing. The panel member P of the cabinet structure may be of any metal, wood, plastic or other material and is provided at predetermined points over the area thereof with the required number of bolt passages 1 for bolts or screws 5 for securing as many units of the improved shockproof and insulated support of the invention as may be considered necessary or desirable for any particular installation. Likewise, the chassis member 10 may be of any suitable metal, wood, plastic, or fibre-board construction but usually is in the form of a metallic plate or panel and is provided with a circular grommet receiving opening 11 in concentric relation to the associated bolt passage 1 in the supporting panel P.

The grommet 15 is made of soft rubber or other resilient material in the general form of a disk having an annular groove on its periphery defining spaced circular flanges 16 on either side of a cylindrical body portion 17. The size of said cylindrical body portion 17 preferably is of the same size as the opening 11 and the thickness thereof substantially the same as the thickness of the peripheral marginal portion of the panel so that said grommet fits in snug engagement with the circular edge of said opening and with the spaced flanges 16 in surface engagement with the opposing faces of the plate adjacent said opening. In this relation, the spaced flanges 16 are flexible relative to the body portion 17 of the grommet and are adapted to yield slightly in any direction responsive to shock or vibratory effects to dampen the same. The grommet is provided with a central bore 18 which together with the flexibility of the flanges 16 permits the grommet to be readily compressed as necessary to snap either flange 16 through the opening 11 in preassembling the grommet on the plate member 10 as shown in Figs. 1 and 2, after which the bushing type of nut device 20 is assembled within the central bore 18 of the grommet and the bolt or screw 5 applied to complete the mounting. Thus the chassis member 10 or similar part is mounted on the panel member P of the cabinet structure, or the like, in such a way that jar or vibration transmitted to the cabinet is absorbed by the rubber grommet and the resilient thread engaging means of the fastener 20, presently to be described.

The fastener 20, Figs. 4 and 5, is a relatively simple, inexpensive article of manufacture that may be provided at comparatively low cost from standard sheet metal material. Any suitable sheet metal may be employed but preferably that of a spring metal nature such as spring steel or cold rolled metal having spring-like characteristics. In general, the fastener comprises preferably a disc-like body defining an annual head or washer portion 21 provided with radial slits or notches 22, Figs. 3 and 4, presenting spaced edges adapted to bite into the adjacent surface of the grommet and thereby prevent slippage of the fastener in the application and tightening of the bolt or screw 5 therewith. The central area of the fastener within the washer or head portions 21 is formed into an integral upstanding annular sleeve defining a hollow, tubular generally cylindrical wall 25, the periphery of which is of a size approximating that of the generally cylindrical central bore 18 in the grommet. The cylindrical wall or sleeve portion 25 is relatively strong and rigid and, accordingly, is designed to be received within the bore 18 in the grommet to serve as a bushing which forms a firm and relatively rigid bearing through the center of the grommet that provides suitable strength in the support. At the bottom or end of the cylindrical wall 25, a disc-like base 26 defines the nut portion of the fastener and is provided with integral bolt or screw engaging means 27, 28, that project inwardly within the inner area of the hollow, cylindrical wall 25 of the bushing portion of the fastener.

The thread engaging elements 27, 28, are best provided from the sheet metal material of the base 26 by an aperture intermediate spaced parallel slits which form cooperating tongues, or the like, having spaced extremities defining the desired thread or thread opening corresponding substantially to the root diameter of the bolt or screw for threadedly engaging the thread thereof. Said tongues 27, 28, otherwise are preferably formed to project inwardly out of the plane of the base 26 and are bent lengthwise in substantial ogee formation to provide for the maximum strength obtainable to withstand the tightening action of the bolt or screw 5 as it is advanced to final applied fastening position.

Such thread engaging means may be pressed, stamped, extruded, or otherwise provided on the fastener in any suitable form or construction so long as the same threadedly engage with the thread of the bolt or screw and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, it has been found that such thread engaging means prepared in the form of cooperating, yieldable tongues as shown, are most efficient and practical in that they are possessed of unusual inherent strength and will not collapse or pull through during tightening of the bolt or screw 5. The sheet metal material from which such tongues are formed is of less thickness than the pitch or spacing between adjacent thread convolutions on the bolt or screw, wherefore the extremities of said tongues tend, more effectively, to move toward each other and dig into the grooves intermediate adjacent thread convolutions when tightened and otherwise become embedded in the root of the bolt in locked frictional fastening engagement therewith. Thus, in the present example, the tongues 27, 28, are shown as extending inwardly out of the plane of the base 26 in substantial ogee formation and provided preferably with arcuately notched extremities, forming substantial biting jaws designed to cut into the root of the bolt and the adjacent thread surfaces thereon in positive locking relation therewith in the most effective manner. There is thereby eliminated the necessity for a separate, auxiliary locking means such as a lock nut or lock washer and this, in mass production, makes possible considerable savings not only in the cost of such locking devices, but also, in the expense and labor involved in the tedious, time consuming assembling operations and other added steps in manufacture which such auxiliary locking means require. It is to be understood, however, that the present invention is not limited in any manner or form to the illustrated construction of the thread engaging means but rather, comprehends also, various other similar and related forms of such tongues or equivalent thread engaging elements.

It will be appreciated, further, that the fastener 20 is formed from a minimum of material with a suitable relatively rigid base 26 for providing the bolt engaging means comprising the cooperating resilient tongues 27, 28. The fastener thus provided is most simple and inexpensive and by reason of its general cup-shaped design requires only a minimum of space such that it is admirably suited for use in installations calling for fasteners which are small and compact and yet strong and durable.

The component parts of the shockproof mounting are assembled in a minimum of time, effort and operations simply by assembly the grommet 15 in the opening 11 in the base 10, frame, bracket or other member to be mounted, and then assembling the combined washer, bushing and nut fastener 20 within the central bore 18 of the grommet as shown in Figs. 1 and 2, whereupon the associated bolt or screw 5 is threadedly connected with the resilient thread engaging elements 27, 28 of the fastener to secure the mounting to the panel member P or other support. In mass production methods of assembly, the required number of grommets 15 are preassembled throughout a structure preparatory to the final mounting of the same and it is, therefore, a relatively simple procedure to assemble a fastener 20 in each grommet 15 and thereafter apply a bolt or screw to secure each individual shockproof support in completing the installation with speed and facility.

In the tightened position of the bolt or screw 5, the integral thread engaging tongues 27, 28 on the fastener 20 effect a thread locking action on the bolt which prevents loosening or reverse turning thereof toward removal. These thread engaging elements 27, 28 otherwise are inherently resilient and therefore are in resilient engagement with the bolt 5 at all times and adapted to yield and flex in connected relation with the bolt. Consequently any jar or vibration acting on the support P and the associated bolt 5 is absorbed to an important degree by the yielding nature of the integral tongues 27, 28 in resilient threaded engagement with the bolt or screw 5.

The body portions 21 of the fastener preferably define a head of a size smaller than the size of the opening 11 in the supported part 10 so that the central portion of grommet 15 is clamped by said body portions 21 without clamping the peripheral flanges 16 of the grommet. Said flanges 16 of the grommet, accordingly, are adapted to flex and yield in connected relation with the marginal portions of the opening 11 in the supported part 10. Such flexibility in the flanges 16 in addition to the resiliency of the body of the grommet 15, which is composed of soft rubber or other resilient material, together with the aforesaid yielding characteristics of the thread engaging tongues 27, 28 of the fastener 20 provide a shock absorbing support that has been found in use to be highly practical and exceptionally efficient in dampening the effects of shock, jarring and vibration to which the cabinet P or other support may be subjected without transmitting the same to the radio chassis part or other supported member 10.

Although the invention is described in connection with a shockproof and insulated support which is particularly useful in the mounting of the chassis of a radio set in a cabinet structure, it will be appreciated that the invention is equally applicable to a wide range and variety of other applications and uses in the fabrication and mounting of lightweight parts in cabinet structures, casings, housings, and the like, in accordance with the general principles, procedure and teachings of the instant disclosure.

The fastener 20 comprising the combined washer, bushing and nut device preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable installation adapted for a long period of satisfactory service and use.

While the invention has been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. In a shock absorbing mounting, a part having a grommet opening, a grommet positioned over said opening comprising a resilient body having a bore, a fastener associated with said grommet comprising a sheet metal body defining a washer portion bearing on said grommet, a bushing portion received in said bore in the grommet and a nut portion carried by said bushing portion comprising resilient thread engaging means, and a bolt or screw having a threaded connection with said resilient thread engaging means in spaced relation to the wall of said bore in the grommet and securing said part to a supporting part in a resilient joint provided by the resiliency of said grommet and the resiliency of said resilient thread engaging means.

2. In a shock absorbing mounting, a part having a grommet opening, a grommet in said opening comprising a resilient body having a bore and a flange bearing on either side of said part adjacent said grommet opening, a fastener associated with said grommet comprising a sheet metal body defining a washer portion bearing on said grommet, a bushing portion received in said bore in the grommet and a base at the end of said bushing portion comprising resilient thread engaging means stamped from said base, and a bolt or screw having a threaded connection with said resilient thread engaging means in spaced relation to the wall of said bore in the grommet and securing said part to a supporting part in a resilient joint provided by the resiliency of said grommet and the resiliency of said resilient thread engaging means.

3. In a shock absorbing mounting for securing parts in spaced relation to dampen vibration effects and the like, one of said parts having a grommet receiving opening, a grommet in said opening comprising a resilient body having a bore and flanges engaging opposite sides of said part adjacent the grommet opening with one of said flanges spacing said part from the other part, a fastener comprising a sheet metal body defining a head portion engaging the grommet adjacent the other flange thereof, a bushing portion received in said bore in the grommet, a base at the end of said bushing portion and resilient thread engaging means stamped from said base, and a bolt or screw having a threaded connection with said resilient thread engaging means in spaced relation to the wall of said bore in the grommet and securing said parts in a resilient joint provided by the resiliency of said grommet and the resiliency of said resilient thread engaging means.

JOHN E. FLANAGAN.

REFERENCES CITED

The following references are of record in the file of this patent:

UNITED STATES PATENTS

| Number | Name | Date |
| --- | --- | --- |
| 2,123,764 | Berry | July 12, 1938 |
| 2,223,028 | Dobson | Nov. 26, 1940 |
| 2,386,732 | Whohlhieter | Oct. 9, 1945 |
| 2,401,202 | Tinnerman | May 28, 1946 |
| 2,417,263 | Morehouse | Mar. 11, 1947 |

FOREIGN PATENTS

| Number | Country | Date |
| --- | --- | --- |
| 103,226 | Australia | Feb. 8, 1938 |